United States Patent

[11] 3,617,947

| [72] | Inventors | Garold K. Jensen<br>Pinecrest, Va.;<br>James E. McGeogh, Silver Spring, Md. |
|---|---|---|
| [21] | Appl. No. | 407,589 |
| [22] | Filed | Oct. 29, 1964 |
| [45] | Patented | Nov. 2, 1971 |
| [73] | Assignee | The United States of America as represented by the Secretary of the Navy |

[54] WIDE BAND FREQUENCY MODULATOR
6 Claims, 3 Drawing Figs.

[52] U.S. Cl. ................................................. 332/18,
307/318, 328/143, 331/177 V, 331/181, 332/22,
332/29 M, 332/30 R
[51] Int. Cl. ........................................................ H03c 3/08,
H03c 3/18, H03c 3/22
[50] Field of Search ............................................. 307/88.5,
18, 18.1 CD; 325/34, 47, 145; 328/142, 143;
331/181, 177 V, 18, 22; 332/21, 23, 27, 29, 29 M,
30, 30 V

[56] References Cited
UNITED STATES PATENTS

| 2,495,634 | 1/1950 | Hepp | 332/29 X |
|---|---|---|---|
| 2,609,535 | 9/1952 | Harmon | 332/23 X |
| 2,895,046 | 7/1959 | Martin | 328/142 |
| 3,154,753 | 10/1964 | Rusy | 307/88.5 UX |
| 3,227,967 | 1/1966 | Ebisch | 307/88.5 UX |
| 3,249,897 | 5/1966 | Trilling | 307/88.5 UX |

OTHER REFERENCES

A.R.R.L., The Radio Amateur's Handbook, 31st Ed., 1954, TK6550R1625, page 85 relied on.

Brady, Oscillator Design Using Voltage-Variable Capacitors, In Electronics, Vol, 32, No. 34, August 21, 1959, TK7800E58, pages 38–40 relied on.

*Primary Examiner*—Rodney D. Bennett, Jr.
*Assistant Examiner*—Daniel C. Kaufman
*Attorneys*—R. S. Sciascia and A. L. Branning ABSTRACT: Variable frequency oscillator having a back-biased semiconductor element and controlled by low- and high-frequency input signals, either of which is capable of varying the oscillator frequency over a 2:1 range. Nonlinearity of oscillator compensated by linearizing circuit which includes compensating distortions in the form of nonlinear tubes and shunted diode, voltage divider circuit.

INVENTORS
GAROLD K. JENSEN
JAMES E. McGEOGH

BY *James D. Murray*
*R. S. Sciascia* ATTORNEYS

INVENTORS
GAROLD K. JENSEN
JAMES E. McGEOGH

ATTORNEYS

WIDE BAND FREQUENCY MODULATOR

The invention described herein may be manufactured and used by or for the Government of the United States of America for governmental purpose without the payment of any royalties thereon or therefor.

This application is a continuation-in-part of application Ser. No. 285,555, filed 31 May 1963, for RADAR SYSTEM and application Ser. No. 381,590, filed 9 July 1964, for SIMULATOR OF RADAR RETURN SIGNALS FROM AN ACCELERATING TARGET. Both of the parent applications were filed in the name of the same inventors as the present application.

The present invention relates to a variable frequency oscillator system and more particularly to an oscillator system, the frequency of which is simultaneously modulated by both a high and a low-frequency signal input and the frequency deviation of which is both large and extremely linear.

In developing the radar system and the associated testing simulator described in the previous applications, the need arose for a variable frequency oscillator, the output of which could be simultaneously modulated by a first signal of low frequency, typically in the order of a half cycle per second, and by a second signal of high frequency, typically in the order of 5 KC. In addition, it was required that the frequency deviation of the desired oscillator be extremely linear throughout the operating range and that the frequency deviation be large, typically such that the oscillator frequency could be varied over a 2:1 frequency range by either or both of the modulation inputs.

Although the frequency modulation of oscillators is a venerable problem which the electronic technology has, to a large extent, successfully solved, the extremely wide frequency deviation and the extreme degree of linearity desired rendered all known prior art devices inadequate.

The present invention provides the desired large frequency deviation by including a back-biased semiconductor diode in the resonant circuit of a Clapp-type oscillator, this form of oscillator being known to have very desirable stability properties. However, such a diode containing oscillator is nonlinear. To provide the desired linearity, the present invention combines a linearizing circuit with the diode containing Clapp oscillator, the linearizing circuit so distorting the input low and high frequency modulating signals as to compensate for the nonlinearity of the oscillator.

An object of the present invention is to provide an oscillator, the frequency of which can be simultaneously modulated by a high and a low frequency signal.

Another object is to provide an oscillator, the frequency deviation of which is both extremely large and extremely linear throughout the operating range.

A still further object of the invention is to provide an oscillator, the frequency of which can be simultaneously modulated by a high and a low frequency signal and the frequency deviation of which is both extremely large and extremely linear throughout the operating range.

The exact nature of this invention, as well as other objects and advantages thereof, will be readily apparent from consideration of the following specification relating to the annexed drawings in which.

Figure 1:
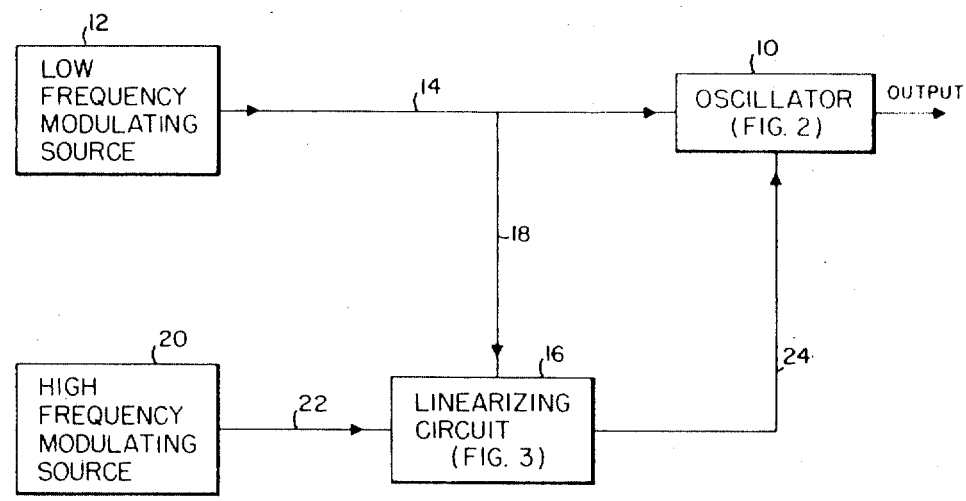
FIG. 1 is a block diagram of the invention.

With reference now to FIG. 1 of the drawings a block diagram of the apparatus embodying the teachings of the present invention is shown. The oscillator, the frequency of which it is desired to modulate, is indicated by the reference numeral 10. A low-frequency modulating source 12 is connected by conductor 14 to apply a first modulating signal to oscillator 10. The low-frequency source 12 is also connected to linearizing circuit 16 by conductor 18. A high-frequency source 20 is also connected, by conductor 22, to the linearizing circuit 16, which is in turn connected by conductor 24 to apply a second modulating signal to oscillator 10.

Figure 2:
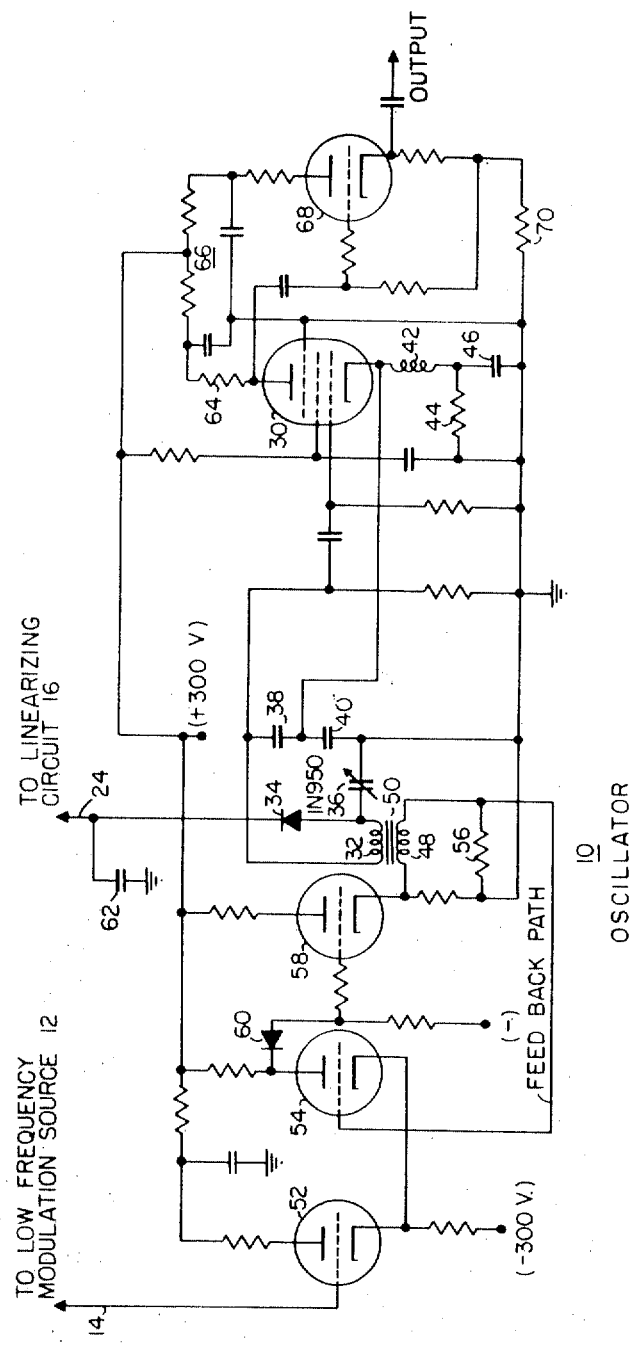
FIG. 2 is a circuit diagram of the oscillator portion of the invention.

FIG. 2 shows, in circuit diagram form, details of the modulated oscillator 10. The basic Clapp-type oscillator consists of tube 30 and a resonant circuit which includes inductance 32, voltage variable capacitor diode 34 and the trimmer capacitance 36. Series capacitances 38 and 40 form a circuit which determines the feedback ratio of the basic oscillator. The common connection of the capacitances 38 and 40 is connected to the cathode of tube 30, a DC return for the cathode of tube 30 being provided by inductance 42 connected through biasing resistance 44 to ground. Bias resistance 44 is bypassed by capacitance 46.

The semiconductor diode 34 is selected from the commercially available diodes of the type having variable capacitance properties when back-biased. Typically a type IN950 diode has been found to give satisfactory operation.

Frequency deviation of the basic oscillator is obtained in two ways. The first is by varying the current through the winding 48, and the magnetization in the core 50, whereby the inductance of the component 32 is changed to control the oscillator frequency. This first variation, which accomplished at a low frequency, is accomplished by connecting the low-frequency signal source 12 and conductor 14 to the grid of tube 52 which is employed as a cathode driver for the subsequent tube 54. Tube 54 has a second input applied to its control grid, this second input being a feedback signal proportional to the current flowing through the control winding 48 and the voltage drop across resistance 56 which is effectively in series with winding 48 as far as the DC current therethrough is concerned. The anode to tube 54 is coupled to the grid of tube 58 which functions primarily as a current amplifier for driving current through the winding 48. Tube 58 is connected in a cathode follower form of circuit which is suitable for the low impedance driver function of this tube. The coupling between tubes 54 and 58 is of a DC nature with appropriate potential control provided by a zener type diode, or other such component, indicated by the reference numeral 60.

A high degree of linearity between the potential on conductor 14 and the current through winding 48 results from the feedback path into the tubes 54 and 58.

Frequency deviation of the basic oscillator is also obtained by varying the capacitance of diode 34 which is included in the resonant circuit of the basic oscillator. The capacitance of diode 34 is varied, in a nonlinear relationship, by the output of the linearizing circuit 16 which is applied to the diode 34 by conductor 24. The oscillator frequency is bypassed to ground by capacitor 62. As previously mentioned, the properties of the diode 34 both allow the large frequency deviation of the basic oscillator and require the compensating effects of the linearizing circuit 16.

Output signals of the base oscillator are taken at the anode of tube 30 which is connected to a 300 volts positive potential source through resistance 64 and suitable filtering indicated in general by reference numeral 66. The anode of tube 30 is coupled to tube 68. Tube 68 is connected, together with resistor 70, in a cathode follower stage with plate and grid parasitic suppression and plate decoupling. The system output is taken at the cathode of tube 68.

Figure 3:
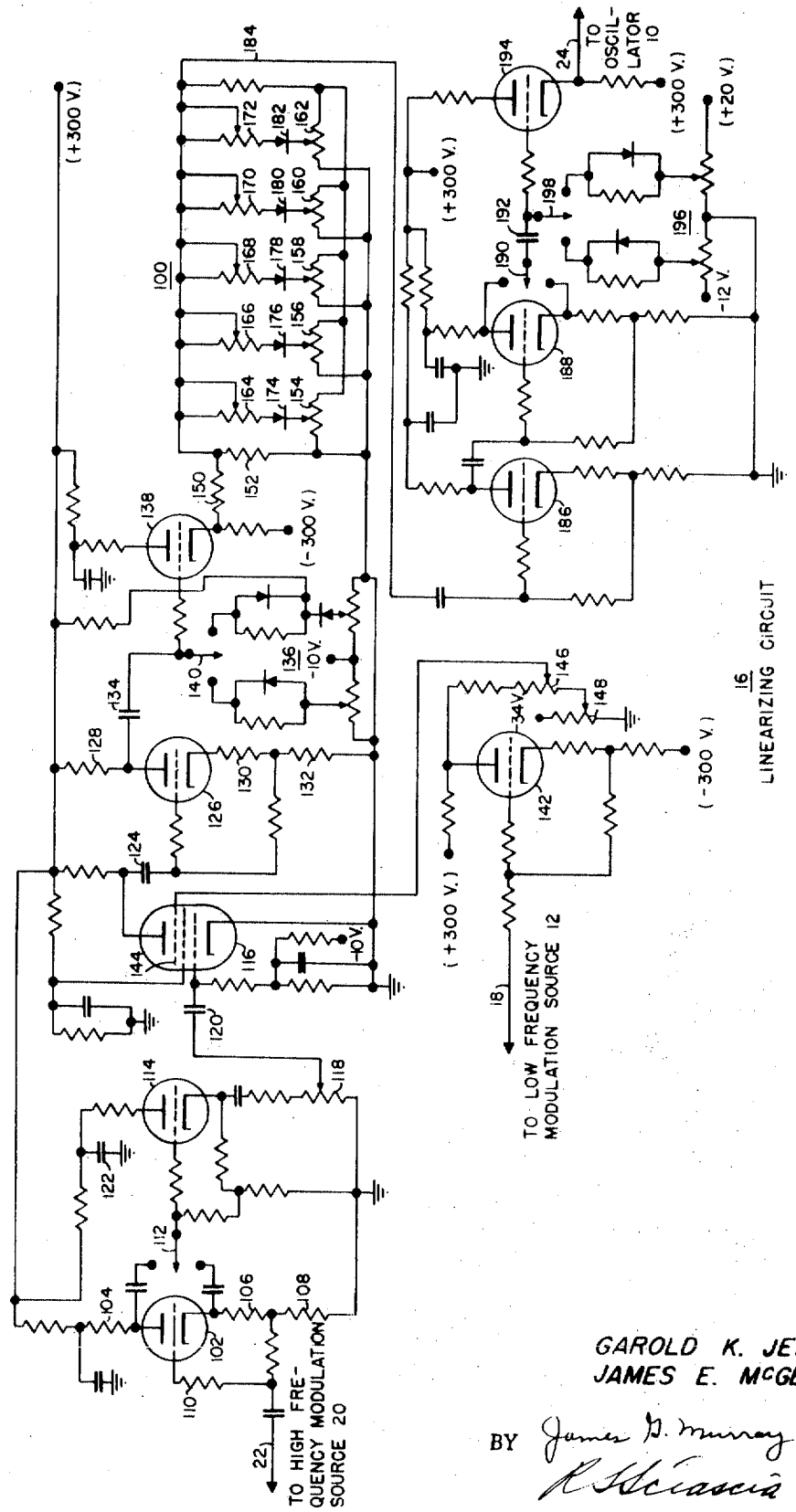
FIG. 3 is a circuit diagram of the linearizing portion of the invention.

Referring now to FIG. 3, the linearizing circuit 16 of FIG. 1 is shown in schematic detail. As has been previously indicated, the function of the linearizing circuit is to distort the signals from the low and high frequency modulating sources 12 and 20 is such as way as to compensate for the nonlinear characteristics of the oscillator 10. To this end the linearizing circuit 16 employs a variable voltage divider arrangement, indicated in general by the reference numeral 100. The high-frequency modulating signal from source 20 is connected by conductor 22 to a split-load form of inverter device, of which tube 102 is the principal element. The anode load resistor 104 and the cathode loading resistors 106 and 108 are of such size as to result in the production at the anode and cathode to tube 102 of equal amplitude but opposite polarity signals. Grid resistor 110 is provided to eliminate parasitic oscillations. Selection of the desired polarity from the stage of tube 102 is accomplished by the switch 112 connected to the grid of tube 114. This tube is included in a cathode follower circuit connected to the grid of the succeeding tube 116 through a potentiometer 118 and a suitable coupling circuit, indicated in general by reference numeral 120. Tube 114, as mentioned, is in a cathode follower circuit which includes parasitic suppressing resistors in the anode and grid circuits together with a plate supply decoupling or filtration circuit, the latter being indicated in general by reference numeral 122. Tube 116 is included in an anode loaded circuit of conventional fixed bias configuration, the output being taken from the anode through capacitance 124 to drive the succeeding amplifier stage of tube 126. This tube is in a stage of amplification, inserted partly for inversion, with the anode resistance 128 and cathode resistances 130, 132 being of such size as to provide inversion with a minimum introduction of distortion. The anode of tube 126 is coupled by a capacitance 134, together with DC restoration components indicated in general by reference numeral 136, to the grid of tube 138 which is employed as a low-impedance driver for the linearizer network 100. As shown, the DC restoration components, which are required by voltage sensitive linearizer network 100, include two clamping networks, either one of which can be selected by operation of switch 140 to clamp the grid of tube 138 to either a positive or negative potential. The choice of potential is largely determined by the nature of the input signal on conductor 22. For example, if the input waveform is a positive going sawtooth, it may be desirable to use a different clamping level than would be employed if the input waveform is a negative going sawtooth. Additionally, care must be taken as to the DC levels existing in the output conductor 24 of the linearizing circuit because this conductor is connected to the critical diode 34 in FIG. 2.

In order to better describe the function of the linearizing circuit 16, it is at this time helpful to discuss the nature of the nonlinearity introduced in the oscillator 10 by diode 34. This diode causes a first distortion in the output of oscillator 10 because of the nonlinearity of the change of frequency produced by the diode capacitance in response to a signal applied by conductor 24. This first distortion is compensated by the nonlinearity introduced by linearizer network 100, which will be subsequently described in detail. A second distortion in oscillator 10 occurs because the capacitance of diode 34 also varies in response to a change in the inductance in winding 32 which occurs due to the change of magnetization in core 50, which in turn results from the low-frequency modulation signal applied to the oscillator 10 by conductor 14. To compensate for this second distortion it is necessary to introduce the low-frequency modulation signal into the linearizing circuit 16 by way of conductor 18.

Conductor 18 is connected to the grid of tube 142, the anode of which is in turn connnected to the suppressor grid 144 of tube 116 via a double potentiometer network 146 and 148. The gain of variable amplifier tube 116 is controlled by the DC level and magnitude of the signal on the suppressor grid 144, which are in turn controlled by the potentiometer networks 146 and 148. Thus, the circuitry of tubes 116 and 142, which includes the potentiometer networks 146 and 148, provides the second distortion necessary to compensate for the variance of the capacitance of diode 34 in response to a change of inductance in winding 32 caused by the signal from the low-frequency source 12.

Returning now to the linearizer network 100, which provides the first distortion, required primarily by the nonlinearity of the frequency vs applied voltage characteristic of diode 34 in response to a signal applied by conductor 24. The linearizer network 100, which is connected to receive the output of tube 138, is primarily a voltage divider network with basic resistance elements 150 and 152. Alteration of the basic division ratio of resistance 150 and 152 is obtained by shunt networks which include potentiometers 154, 156, 158, 160 and 162, variable resistances 164, 166, 168, 170 and 172 and semiconductor diodes 174, 176, 178, 180 and 182. In these networks, by varying the setting of the potentiometers it is possible to vary the level of the applied signal at which the additional shunt becomes effective and by varying the variable resistances, it is possible to vary the effective resistance added by the shunt network when the diode becomes conductive. Thus it is possible, by proper adjustments, to cause the linearizer network 100 to provide the distortion which will compensate for the nonlinear characteristics of diode 34. While five shunting networks have been illustrated, it is apparent that a greater or lesser number can be used, depending upon the degree of matching of the diode 34 characteristics required for the operation of the overall system. It is also worthy of mention that the operation of linearizer network 100 requires careful control of the proper DC voltage levels, this control being accomplished by the clamper circuits generally indicated by reference numeral 136.

The output of linearizer network 100 in applied by lead 184 to an amplifying stage which includes tube 186, which is in turn connected to tube 188. Tube 188 is included in an inversion circuit wherein switch 190 selectively provides opposite polarity signals, via capacitor 192, to a cathode follower stage which includes tube 194 and which provides the output signal on conductor 24. As previously mentioned, the DC voltage on conductor 24, which is connected to the critical diode 34 of oscillator 10, must be closely controlled. For this purpose there is provided DC restoration components, consisting of clamping circuits indicated generally by reference numeral 196 and a selector switch 198.

It will, by now, be apparent that there has been disclosed a variable frequency oscillator 10 which is driven by a low-frequency modulating source 12 and by a high-frequency modulating source 20. Oscillator 10 is capable of a large frequency deviation because of the characteristics of diode 34. However, these characteristics are nonlinear and require the double distortion produced in the linearizing circuit 16 by linearizer network 100 and the circuitry which includes tubes 116 and 142 and potentiometers 146 and 148.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. An oscillator system having a large frequency deviation and extreme linearity comprising:
   variable frequency oscillator means having a resonant circuit which includes a variable capacitance, back-biased semiconductor diode whereby the frequency deviation of said oscillator means is large but is nonlinearly related to modulating signals applied to said oscillator means;
   first signal source means for producing a first modulating signal;
   second signal source means for producing a second modulating signal;
   linearizing circuit means which includes a nonlinear component which causes the input and output signals of said linearizing circuit means to be related in a manner which compensates for the nonlinearity in said variable frequency oscillator means and
   circuit means connecting said first and second signal source means to said linearizing circuit means and one of said signal source means and said linearizing circuit means to said variable frequency oscillator means
   whereby the frequency deviation of said variable frequency oscillator means is linearly related to each of said first and second modulating signals.

2. The oscillator system of claim 1 wherein said circuit means connects said linearizing circuit means to said variable capacitance, back-biased semiconductor diode in said variable frequency oscillator means.

3. The oscillator system of claim 1 wherein said nonlinear component is a voltage divider circuit which includes two resistances connected in series, and one or more diode circuit means connected in parallel with one of said two resistances, said diode circuit means being effective to shunt said one resistance at predetermined values of the potential drop across said one resistance.

4. The oscillator system of claim 3 wherein said linearizing circuit further includes:
   a multigrid tube, said circuit means connecting said first and second signal source means to different grids of said multigrid tube and
   means connecting the anode of said multigrid tube to said nonlinear component.

5. The oscillator system of claim 4 wherein said circuit means connects said linearizing circuit to said variable capacitance, back-biased semiconductor diode in said variable frequency oscillator means.

6. A variable frequency oscillator system having a large frequency deviation and extreme linearity comprising:
   oscillator means having an output signal, the frequency of which changes in nonlinear response to either or both of two input signals;
   low frequency modulating signal source means connected to said oscillator means to supply the first of said two input signals;
   high frequency modulating signal source means;
   linearizing circuit means connected to said low frequency and said high-frequency modulating signal source means to combine the signals therefrom into a linearizing circuit output signal which is distorted in such a way as to compensate for the nonlinear response of said oscillator and
   connecting means for applying said linearizing circuit output signal to said oscillator means as the second of said two input signals
   whereby said oscillator output signal is extremely linearly related to both said low and high frequency modulating signals.

* * * * *